(12) United States Patent
Willey

(10) Patent No.: US 7,764,034 B2
(45) Date of Patent: Jul. 27, 2010

(54) METHOD AND SYSTEM FOR OPERATING WINDSHIELD WIPERS

(75) Inventor: Mark R. Willey, Grand Blanc, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 273 days.

(21) Appl. No.: 11/929,163

(22) Filed: Oct. 30, 2007

(65) Prior Publication Data

US 2009/0108788 A1      Apr. 30, 2009

(51) Int. Cl.
*H02P 1/04* (2006.01)

(52) U.S. Cl. .................................. 318/443; 318/DIG. 2

(58) Field of Classification Search .................. 318/443, 318/444, 483, DIG. 2
See application file for complete search history.

(56) References Cited

U.S. PATENT DOCUMENTS

| | | | | |
|---|---|---|---|---|
| 4,010,383 A | * | 3/1977 | Grassmann | 307/118 |
| 4,705,998 A | * | 11/1987 | Millerd et al. | 318/444 |
| 4,720,664 A | * | 1/1988 | Iwamoto et al. | 318/444 |
| 5,119,002 A | * | 6/1992 | Kato et al. | 318/444 |
| 5,276,389 A | * | 1/1994 | Levers | 318/444 |
| 5,508,595 A | * | 4/1996 | Schaefer | 318/444 |
| 5,900,821 A | * | 5/1999 | Petzold | 340/604 |
| 6,304,047 B1 | * | 10/2001 | Uchida et al. | 318/445 |

* cited by examiner

*Primary Examiner*—Rina I Duda
(74) *Attorney, Agent, or Firm*—Ingrassia Fisher & Lorenz, P.C.

(57) ABSTRACT

Methods and systems for operating a wiper for removing material impacting a surface of a vehicle are provided. An event indicating that the material has stopped impacting the surface of the vehicle is detected. A first number of wipe cycles are performed with the wiper if movement of the wiper between the detecting of the event and the wiper being moved into a predetermined position is less than a predetermined portion of a wipe cycle of the wiper. A second number of wipe cycles are performed with the wiper if movement of the wiper between the detecting of the event and the wiper being moved into the predetermined position is not less than a predetermined portion of the wipe cycle of the wiper.

18 Claims, 3 Drawing Sheets

METHOD AND SYSTEM FOR OPERATING WINDSHIELD WIPERS

TECHNICAL FIELD

The present invention generally relates to wiper systems, and more particularly relates to a method and a system for operating vehicular windshield wipers.

BACKGROUND OF THE INVENTION

In recent years, advances in technology, as well as ever-evolving tastes in style, have led to substantial changes in the design of automobiles. One of the changes involves the variety and complexity of the luxury and convenience features now found as standard equipment on many automobiles, such as numerous speeds and modes for the operation of the windshield wipers.

Modern automobiles are often equipped with washer fluid systems that spray a cleaning solution onto the windshield to assist in the removal of unwanted debris (e.g., dirt, insects, and salty road splash). The spraying of this solution is often accompanied by the operation of the windshield wipers to enhance the cleaning effect and to remove the solution from the windshield. In some vehicles, after the wash solution spray has ceased, the windshield wipers automatically continue to operate for several seconds (or perform additional wipe cycles), in order to ensure that all of the cleaning solution has been removed from the windshield, thus maximizing the user's visibility through the windshield.

However, conventional wiper systems often perform more wipe cycles than required to completely remove all of the cleaning solution. As a result, the wipers may be swept across a windshield that is virtually dry, perhaps producing undesirable sounds and vibrations. Additionally, these unnecessary wipe cycles increase wear on the motors used to drive the wipers, as well as the wiper blades themselves. Under some driving conditions (e.g., winter driving conditions), these undesirable additional wipes may also cause smearing of the windshield due to debris that has impacted the windshield after the spray has ended.

Accordingly, it is desirable to provide a method and system for operating windshield wipers in such a manner that reduces unnecessary wipe cycles, particularly after washer fluid is sprayed onto a windshield. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method for operating a wiper for removing material impacting a surface of a vehicle is provided. An event indicating that the material has stopped impacting the surface of the vehicle is detected. A first number of wipe cycles are performed with the wiper if movement of the wiper between the detecting of the event and the wiper being moved into a predetermined position is less than a predetermined portion of a wipe cycle of the wiper. A second number of wipe cycles are performed with the wiper if movement of the wiper between the detecting of the event and the wiper being moved into the predetermined position is not less than a predetermined portion of the wipe cycle of the wiper.

A method for operating a wiper for removing liquid dispensed by a pump and impacting a window of a vehicle is provided. The wiper is repeatedly moved across the window from a first position to a second position and from the second position to the first position to remove the liquid. The movement from the first position to the second position and from the second position to the first position defines a wipe cycle. Deactivation of the pump is detected. A first number of wipe cycles are performed if an amount of time between the detecting the deactivation of the pump and the wiper being moved into a predetermined position is less than a predetermined amount. A second number of wipe cycles are performed if the amount of time between the detecting the deactivation of the pump and the wiper being moved into the predetermined position is not less than a predetermined amount.

An automotive wiper system is provided. The system includes a wiper configured to remove liquid impacting a window of an automobile, a motor coupled to a wiper and configured to move the wiper across the window, and a processor in operable communication with the motor. The processor is configured to detect an event indicating that the liquid has stopped impacting the surface of the automobile, move the wiper across the surface a first number of times if an amount of time between the detecting of the event and the wiper being moved into a predetermined position is less than a predetermined amount, and move the wiper across the surface a second number of times if the amount of time between the detecting of the event and the wiper being moved into the predetermined position is not less than the predetermined amount.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-6 are merely illustrative and may not be drawn to scale.

FIG. 1 to FIG. 6 illustrate a method and system for operating vehicular windshield wipers that remove material impacting a surface of a vehicle according to one embodiment of the present invention. An event indicating the material has stopped impacting the surface of the vehicle (e.g., deactivation of a pump dispensing wash fluid) is detected. The wiper is moved across the surface a first number of times if the movement of the wiper between the detection of the event and the wiper reaching a predetermined position is less than a predetermined portion of the movement of the wiper during a full wipe cycle. The wiper is moved across the surface a second number of times if the movement of the wiper between the detection of the event and the wiper reaching the predetermined position is not less than the predetermined portion.

It should be understood that embodiments of the present invention may be used in conjunction with surfaces on a vehicle other than the windshield, such as other windows on the vehicle or a lens of a headlight on the vehicle.

Figure 1:
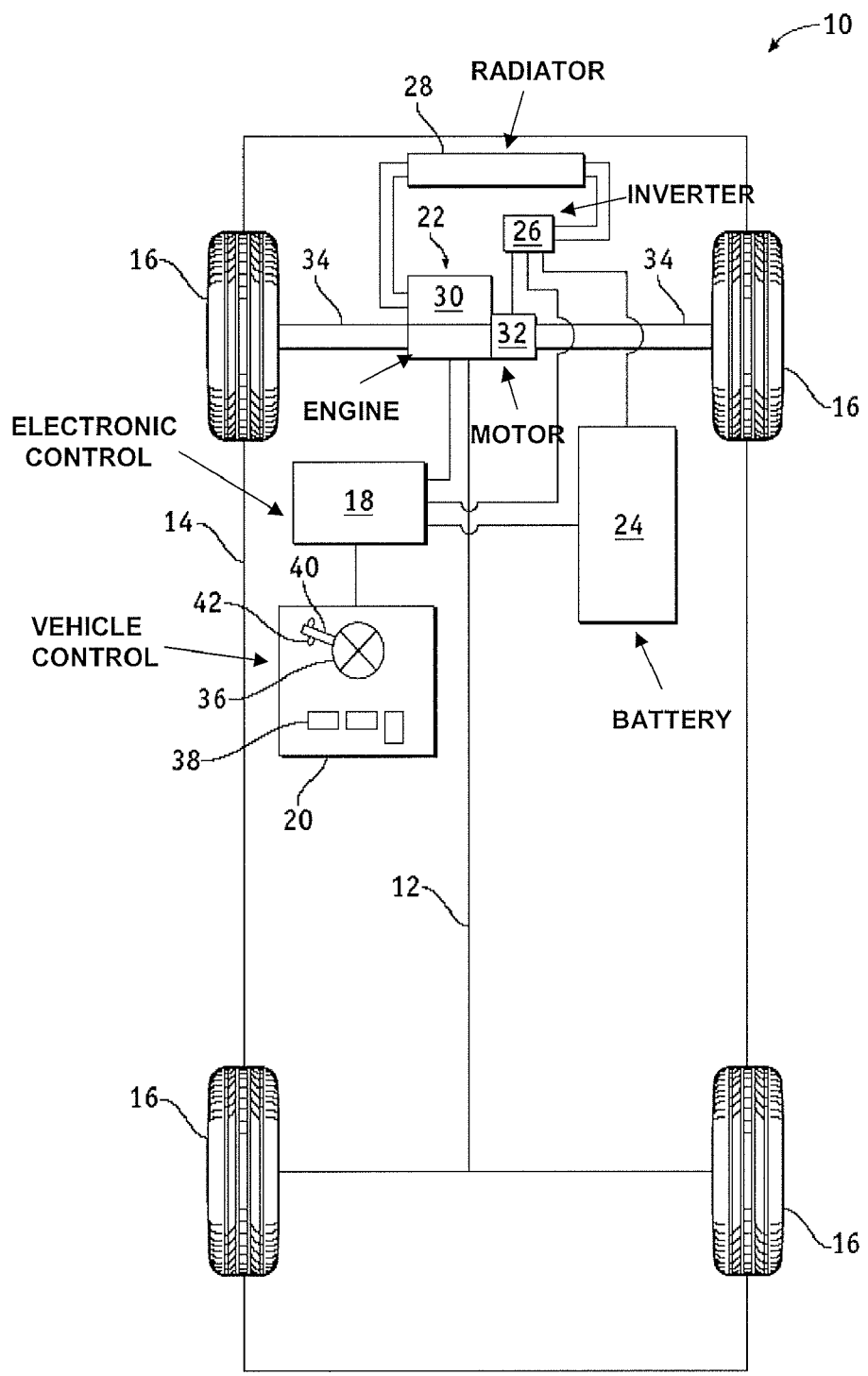
FIG. 1 is a schematic view of an exemplary automobile according to one embodiment of the present invention.

FIG. 1 illustrates a vehicle 10, or "automobile," equipped with a windshield wiper system (FIG. 2), according to one embodiment of the present invention. The automobile 10 includes a chassis 12, a body 14, four wheels 16, an electronic control system (or electronic control unit (ECU)) 18, and a vehicle control system 20. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

In the exemplary embodiment illustrated in FIG. 1, the automobile 10 is a hybrid vehicle, and further includes an actuator assembly 22, a battery 24, a power inverter (or inverter) 26, and a radiator 28. The actuator assembly 22 includes an internal combustion engine 30 and an electric motor/generator (or motor) system (or assembly) 32. The electric motor system 32, in one embodiment, includes one or more sinusoidally-wound, three-phase alternating current (AC) motor/generators (or motors) (e.g., permanent magnet) such as commonly used in automotive vehicles (e.g., traction drive control systems, and the like). As will be appreciated by one skilled in the art, each of the electric motors includes a stator assembly (including conductive coils), a rotor assembly (including a ferromagnetic core), and a cooling fluid (i.e., coolant). The stator assembly and/or the rotor assembly within the electric motors may include multiple (e.g., sixteen) electromagnetic poles, as is commonly understood.

Still referring to FIG. 1, and as described in greater detail below, the combustion engine 30 and the electric motor system 32 are integrated such that both are mechanically coupled to at least some of the wheels 16 through one or more drive shafts 34. The radiator 28 is connected to the frame at an outer portion thereof and although not illustrated in detail, includes multiple cooling channels therethough that contain a cooling fluid (i.e., coolant) such as water and/or ethylene glycol (i.e., "antifreeze") and is coupled to the engine 30 and the inverter 26. Referring again to FIG. 1, in the depicted embodiment, the inverter 26 receives and shares coolant with the electric motor 32. The radiator 28 may be similarly connected to the inverter 26 and/or the electric motor 32.

The electronic control system 18 is in operable communication with the actuator assembly 22, the battery 24, and the inverter 26. Although not shown in detail, the electronic control system 18 includes various sensors and automotive control modules, or electronic control units (ECUs), such as a body control module (BCM) and a wiper control module, and at least one processor and/or a memory which includes instructions stored thereon (or in another computer-readable medium) for carrying out the processes and methods as described below. It should be understood that in some embodiments the automobile 10 may have the functionality of the ECUs distributed across several modules and that the wiper, wash motor, and/or pump functionality may be controlled by electronics and/or software that is either internal or external to the wiper motor (described below) and/or the ECUs.

The vehicle control system 20 is in operable communication with the electronic control system 18 and includes, amongst other components, a steering mechanism (i.e., steering wheel) 36, multiple control pedals (e.g., accelerator pedal, brake pedal, and clutch pedal) 38, and a wiper control lever 40 having a washer fluid control button 42 thereon. As is described in greater detail below, the wiper control lever 40 may be moveable between several different positions.

Figure 2:
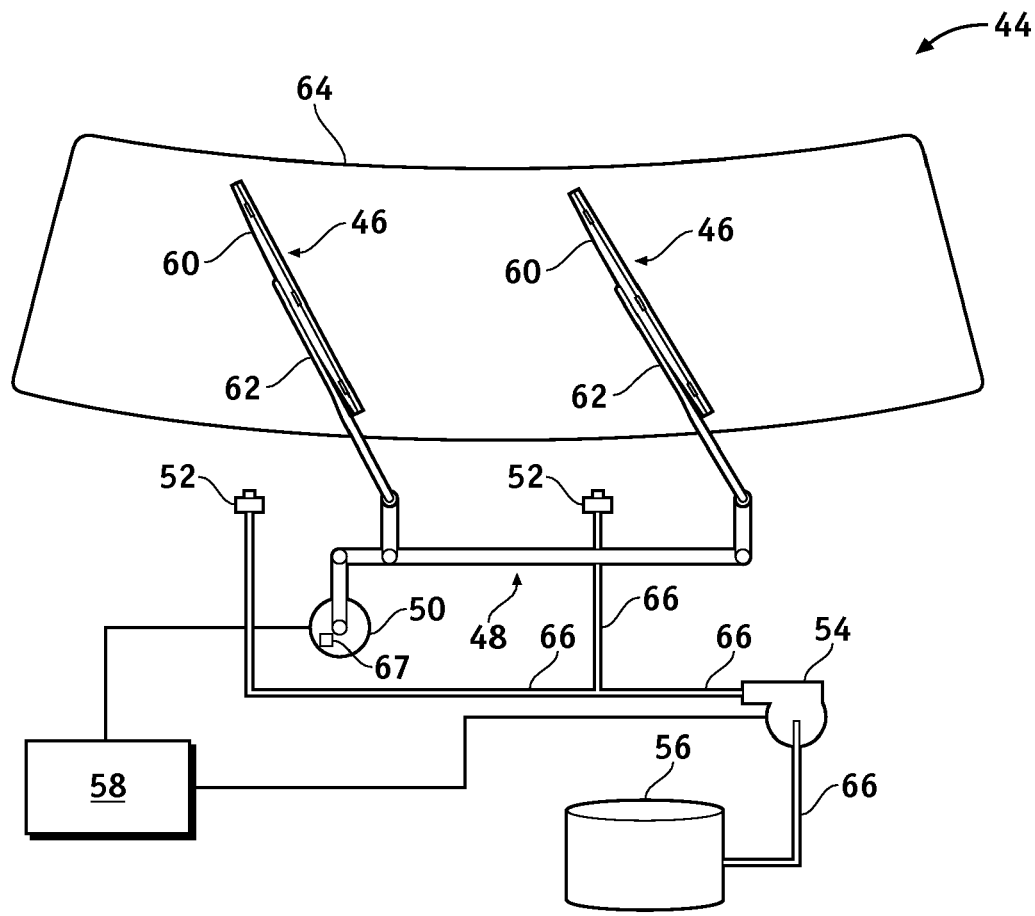
FIG. 2 is a schematic view of a windshield wiper system on the automobile of FIG. 1.

FIG. 2 illustrates a windshield wiper system 44 of the automobile 10, according to one embodiment of the present invention. The wiper system 44 includes wiper assemblies 46, an arm assembly 48, a wiper motor 50, washer fluid nozzles 52, a wash motor pump 54, a washer fluid reservoir 56, and a wiper control module 58. The wiper assemblies (or windshield wipers) 46 each include a wiper blade 60 and a wiper arm 62. The wiper arms 62 are connected to the arm assembly 48 and hold the wiper blades 60 against a windshield (or other window) 64 of the automobile 10. The arm assembly 48 connects the wiper arms 62 to the wiper motor 50 such that actuation of the wiper motor 50 causes the wipers blades 60 to be moved back and forth across the windshield 64. As is commonly understood, the wiper assemblies 46 shown in FIG. 2 are in a "tandem" configuration.

The nozzles 52 are positioned and oriented to direct a fluid, such as washer fluid, onto the windshield 64. Fluid lines 66 interconnect the nozzles 52, the pump 54, and the reservoir 56 such that activation of the pump 54 causes washer fluid to be pulled from the reservoir 56 and sprayed onto the windshield 64 through the nozzles 52.

The wiper control module 58 is in operable communication with the wiper motor 50 and the pump 54 and, in one embodiment, is integral with the electronic control system 18. The wiper system 44 may include one or more sensors, positioned, for example, within the wiper motor 50 or on and/or near the windshield 64, for detecting the position of the wiper blades 60 and/or the wiper arms 62, and are also in operable communication with the wiper control module 58. In the embodiment shown, the sensor is a park switch 67, as is commonly understood, within (or coupled to) the motor 50 to detect when the wiper blades 60 are in the "park" position, as is described below.

Still referring to FIG. 1, the automobile 10 is operated by providing power to the wheels 16 with the combustion engine 30 and the electric motor assembly 32 in an alternating manner and/or with the combustion engine 30 and the electric motor assembly 32 simultaneously. In order to power the electric motor assembly 32, direct current (DC) power is provided from the battery 24 to the inverter 26, which converts the DC power into AC power, before the power is sent to the electric motor 32.

Figure 3:
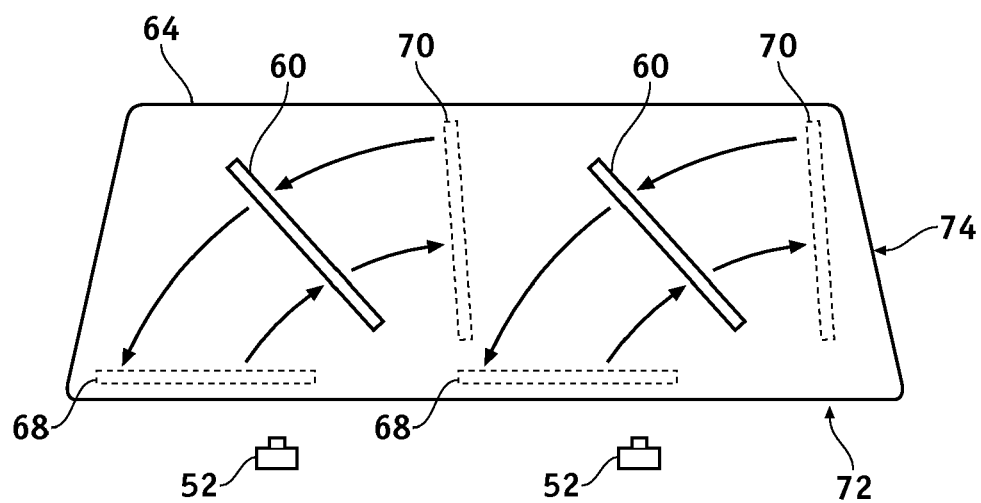
FIGS. 3-6 are schematic views of a windshield, wiper blades, and washer fluid nozzles illustrating the operation of the windshield wiper system of FIG. 1 according to one embodiment of the present invention.

As is commonly understood, if a driver's view through the windshield 64 becomes obstructed due to any material, such as rain, snow, or other debris (e.g., mud), the driver may activate (and deactivate) the windshield wipers 46 by manually moving the wiper control lever 40 to one of the various available positions, depending on the desired wiper speed and/or frequency. FIG. 3 schematically illustrates the windshield 64 and the wiper blades 60 during operation of the windshield wipers 46.

Referring to FIGS. 2 and 3, when activated by the wiper control lever 40 (FIG. 1), rotation of the wiper motor 50 causes the windshield wipers 46 to repeatedly move back and forth on the windshield 64. As shown specifically in FIG. 3, the wiper blades 60 move between a first (or park) position 68 and a second (or outwipe) position 70. In the first position 68, the wiper blades 60 are in a substantially horizontal orientation along a bottom edge 72 of the windshield 64. In the second position 70, the wiper blades 60 may be in a substantially vertical orientation with one of the blades 60 near a central portion of the windshield 64 (or slightly off-center such that the wipe patterns of the blades 60 overlap) and the other blade 60 along a side edge 74 of the windshield 64.

The full motion of the blades 60 from the first position 68 to the second position 70 and back from the second position 70 to the first position 68 may define a "wipe cycle" (or wiper cycle). A "wipe cycle period" is considered to be the amount of time required for the wiper blades 60 to move from the first position 68 to the second position 70 and back from the second position 70 to the first position 68. A "wipe cycle frequency" (or simply "wipe frequency") may then be defined as the number of wipe cycles completed by the wiper blades 60 within a given amount of time (e.g., seconds or minutes). In one embodiment, the wipe cycle period is between 0.5 and 1.5 seconds, such as 1 second. The wipe cycle frequency may be, for example, between 20 and 95 cycles per minute (cpm).

Referring to FIGS. 1 and 2, in the event that the elements or other debris undesirably obscures the view through the windshield 64, the driver may depress the washer fluid control button 42 to activate the pump 54. Washer fluid from the reservoir 56 is sprayed from the nozzles 52 onto the windshield 64. The washer fluid may continue to be sprayed from the nozzles 52 as long as the washer fluid control button 42 is depressed. In another embodiment, an automatic window wash feature of the electronic control system 18 may activate the wash motor pump 54 for a predetermined duration.

In order to clear the washer fluid from the windshield 64, as well as assist in the cleaning of the windshield 64, the electronic control system 18 (and/or the wiper control module 58) operates the motor 50 such that the wiper blades 60 complete a particular number of wipe cycles after an event that indicates that the washer fluid is no longer being sprayed onto the windshield 64. More generally, the wiper blades 60 complete a predetermined number (and/or only a predetermined number) of wipe cycles after an event that indicates the washer fluid is no longer impacting the windshield 64 before stopping in the park position 68.

There are several ways in which the number of wipe cycles after the washer fluid spray (i.e., additional wipe cycles) may be determined. In one embodiment, the number of wipe cycles after the washer fluid spray is a fixed number (e.g., 4 cycles). In another embodiment, the number of cycles is based on the particular type of washer activity. For example, if the washer fluid spray is initiated by the user (as described above) a fixed number of cycles (e.g., 4 cycles) may be performed by the wipers 46. However, if the washer fluid spray was initiated automatically by the electronic control system 18, such as in a "heated" washer fluid operation, another fixed number of cycles (e.g., 6 cycles) may be performed. In yet a further embodiment, the number of cycles may be based on the duration of the washer fluid spray and/or the actuation of the washer fluid control button 42. That is, as the duration of the washer fluid spray increases, the number of wipe cycles that are to be performed after the washer fluid spray also increases.

Figure 4:
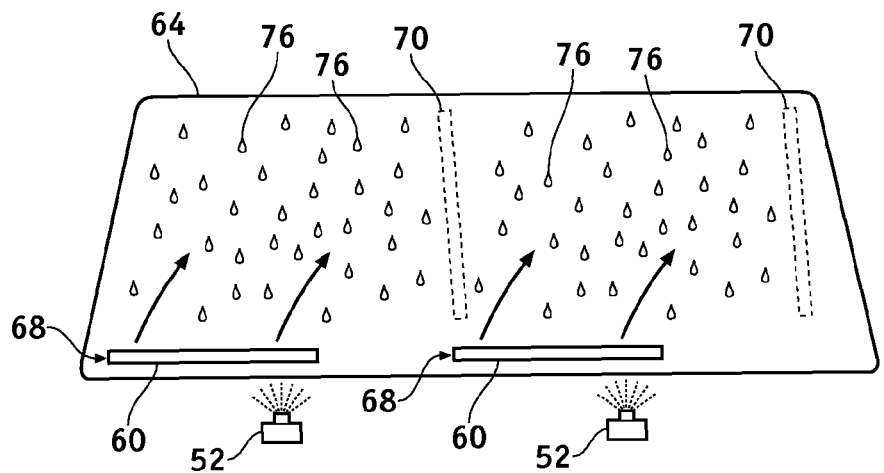

In accordance with one aspect of the present invention, the number of wipe cycles that occur after the washer fluid spray ceases may change based on the position and direction of the wiper blades 60 when the spraying of the washer fluid stops. FIG. 4 illustrates the wiper blades 60 at the initiation of the fluid spray from the nozzles 52. The wiper blades 60 begin in the first position 68 and begin to move towards the second position 70 approximately simultaneously with (or shortly after) the activation of the pump 54 (FIG. 2). As the wiper blades 60 cycle between the first and second positions 68 and 70 (as described above), the blades 60 wipe, push, or remove beads (and/or drops, particles, etc.) 76 of washer fluid from the windshield 64.

In order to determine the position and direction of the wider blades 60, the electronic control system 18 (and/or the wiper control module), in one embodiment, measures the movement of the wiper blades 60 between the deactivation of the pump 54 (and/or the release of the washer fluid control button 42) and the wiper blades 60 being moved into a predetermined position, such as the first position 68. Generally, if this movement is less than a predetermined portion of the wipe cycle, a first number of wipe cycles are performed. If this movement is not less than (i.e., greater than or equal to) the predetermined portion, a second number of wipe cycles are performed. The second number of cycles is, for example, one less than the first number of cycles. In one embodiment, the predetermined portion of the wipe cycle time is slightly less than half of the wipe cycle, such as approximately 49% of the wiper blade motion during a full wipe cycle (or 49% of the wipe cycle).

In one embodiment, the movement of the wiper blades 60 is measured by tracking the amount of time between the deactivation of the pump 54 and the return of the wiper blades 60 to the predetermined position (e.g., the first position 68). If this amount of time is less than a predetermined amount, the first number of wipe cycles is performed. If this amount of time is not less than (i.e., greater than or equal to) the predetermined amount, the second number of wipe cycles is performed. In an exemplary embodiment, the predetermined amount of time is slightly greater than half of the wipe cycle period, such that if the wipe cycle period is for example 1 second, the predetermined amount of time may be approximately 0.51 second. It should be noted that 49% of the full motion of the wiper blades 60 and a 0.51 second delay between the deactivation of the pump 54 and the movement of the wiper blades 60 into their predetermined position, corresponds to the wiper blades 60 being in approximately the same positions when the pump 54 is deactivated.

Figure 5:
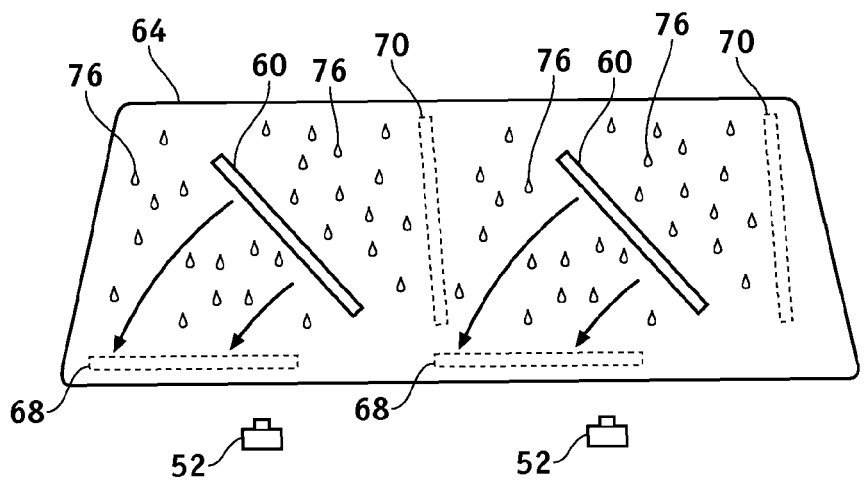

FIG. 5 illustrates the wiper blades 60 in motion from the second position 70 to the first position 68 at the time the pump 54 (and/or nozzles 52) is deactivated. Because the wiper blades 60 are already moving towards the first position 68 when the pump 54 is deactivated, a relatively short amount of time is required for the blades 60 to return to the first position

68. Referring to the example in which the wipe cycle period is 1 second, the motion depicted in FIG. 5 takes less than half the cycle period (i.e., less than half a wipe cycle) plus small buffer period (e.g., 0.51 second), such as 0.3 second. Therefore, the number of wipe cycles that are to be performed after the deactivation of the pump 54 is not altered.

Figure 6:
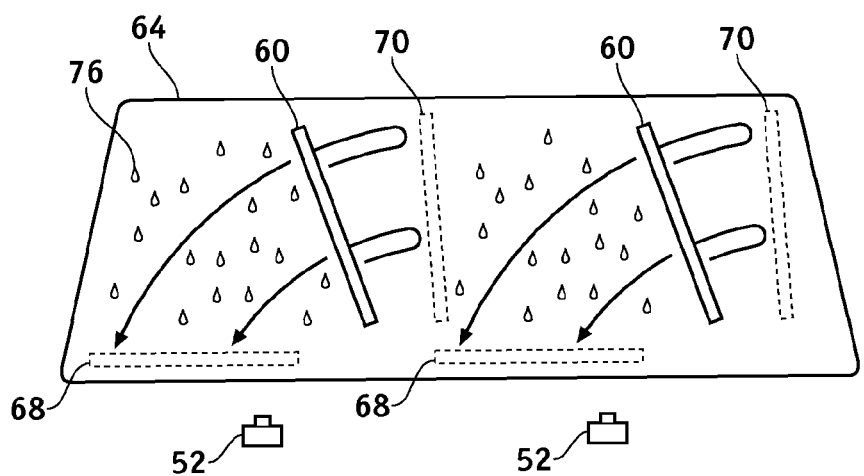

FIG. 6, however, illustrates the wiper blades 60 near, and in motion towards, the second position 70 at the time the pump 54 is deactivated. Because the wiper blades 60 are moving away from the first position 68 when the pump 54 is deactivated, a relatively long amount of time is required for the blades to return to the first position 68. Referring again to the example in which the wipe cycle period is 1 second, the motion depicted in FIG. 6 takes more than half the cycle period (i.e., more than half a wipe cycle) plus the small buffer (e.g., 0.6 seconds), because the blades cover more than half of their full wipe cycle. Therefore, the number of wipe cycles that are to be performed after the deactivation of the pump 54 is altered. In one embodiment, the number of wipe cycles is reduced by one.

After the wipe cycles are performed, the wiper blades 60 are returned into their park position 68. Any subsequent use of the washer fluid may reinitiate the process described above. If the pump 54 is reactivated while the wipe cycles caused by the previous use of the pump 54 are being carried out, upon deactivation of the pump 54, the system may perform the greater number of additional wipe cycles that are remaining from either the previous use of the pump 54 or the most recent use of the pump.

For example, if the previous wash caused ten additional wipe cycles to be performed and the subsequent wash occurs after only four of those wipe cycles have been carried out, upon deactivation of the pump 54, the system may proceed with either six wipe cycles or the number of wipe cycles that is deemed appropriate for the subsequent wash, whichever is greater. Thus, if the subsequent wash is very short and the system determines that only one additional wipe cycle is required because of the subsequent wash, the system may still carry out all six of the wipe cycles remaining from the previous wash. However, if the subsequent wash is determined to require eight additional wipe cycles, the system may perform eight wipe cycles, as the number of wipe cycles caused by the subsequent wash is greater than those remaining from the previous wash.

In another embodiment, if the additional wipes have not been performed upon deactivation of the pump 54 prior to a subsequent wash, the number of outstanding additional wipes from the earlier wash may be cleared, and only the additional wipes associated with the most recent wash may be performed.

One advantage of the method and system described above is that because the position and direction of the wiper blades at the time the washer fluid pump is deactivated are essentially determined, the wiping effectiveness of the last motion of the wiper blades before the predetermined wipe cycles can be determined. As a result, the number of wipe cycles can be appropriately adjusted to avoid moving the wiper blades across a substantially dry windshield, while still adequately removing the washer fluid. Therefore, the likelihood that the wiper blades will produce any undesirable noise, vibrations, and smearing is reduced. Additionally, because the number of wipe cycles is reduced in certain circumstances, the wear on the wiper motor, as well as the wiper blades, is reduced, and it longevity and reliability is improved.

It should be understood that events other than the deactivation of the pump may be used as the event that indicates the cessation of the material impacting the windshield. For example, sensors placed on and/or near the windshield may be used to detect material, such as rain, impacting the windshield. In such an embodiment, the sensors may be used to initiate operation of the windshield wipers, while the detection of cessation of the rain may be used as the event from which to time the movement of the wiper blades into the predetermined (e.g., park) position. The amount of time between the detection of the cessation of rain and the movement of the wiper blades into the predetermined position may then be used as above to adjust the number of wipe cycles subsequently performed.

It should also be understood that the required number of wipe cycles that occur after the occurrence of the event that indicates the cessation of the material impacting the window may be one, or even zero. In such an embodiment, if the measured amount of time between cessation of material impacting the window and the wipers reaching their predetermined position is greater than or equal to the predetermined time, no additional wipe cycles are subsequently performed.

Other embodiments may utilize the method and system described above in implementations other than automobiles, such as watercraft and aircraft, and on vehicular surfaces other than windshields, such as other windows and body panels. Other means of determining wiper position at the time of the cessation of material impacting the window may be used, such as absolute wiper position sensors or Hall effect sensors (e.g., resistive potentiometers or inductive/capacitive coupled sensors).

In embodiments using absolute wiper position sensors and/or Hall effect sensors, wiper position and/or direction at the time the cessation occurs may be used in to determine if the wiper will move from the second position to the first position while in the process of completing the normally performed additional wipe cycles. If real time wiper position is known via absolute wiper position sensors or Hall effect sensors, only wiper direction may be required. For example, if the wipers are moving from the out position to the park position at the time the cessation occurs, the first number of wipe cycles are performed, and vice versa. If real time wiper position is known via absolute wiper position sensors or Hall effect sensors, wiper direction and position may be used. For example, if at the time of the cessation, the wipers are either moving from the park position to the out position, or moving from the out position to the park position and are in close proximity to the out position at the time of cessation of material impacting the window, the second number of wipe cycles are performed, rather than the first number of wipe cycles.

It should be noted that the wipe cycle period may be determined as a real time wipe cycle period, a fixed typical value, or a fixed worst case value. The wiper system may include a wiper motor for each of the arms, in which case the arm assembly may not be used. The wiper assemblies may be in configurations other than the tandem configuration show, such a symmetric overlap, or "butterfly," configuration. Although not shown, the wiper blades, when not in use, may actually come to rest in a "depressed park" position below the park position shown in FIGS. 3-6. The wiper control module may be a separate ECU or integral with the wiper motor or motors.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating a wiper for removing material impacting a surface of a vehicle comprising:
   detecting an event indicating that the material has stopped impacting the surface of the vehicle;
   performing a first number of wipe cycles with the wiper if movement of the wiper between the detecting of the event and the wiper being moved into a predetermined position is less than a predetermined portion of a wipe cycle of the wiper; and
   performing a second number of wipe cycles with the wiper if the movement of the wiper between the detecting of the event and the wiper being moved into the predetermined position is not less than the predetermined portion of the wipe cycle of the wiper,
   wherein the wiper is moveable between first and second positions and each wipe cycle comprises movement of the wiper from the first position to the second position and from second position back to the first position.

2. The method of claim 1, wherein the second number is less than the first number.

3. The method of claim 1, wherein an amount of time between the movement from the first position to the second position and from second position to the first position defines a wipe cycle period, the movement of the wiper between the detecting of the event and the wiper being moved into the predetermined position is determined by measuring an amount of time between the detecting of the event and the wiper being moved into the predetermined position, the first number of wipe cycles is performed if the amount of time is less than a predetermined amount, and the second number of wipe cycles is performed if the amount of time is not less than the predetermined amount.

4. The method of claim 3, wherein the predetermined amount of time between the detecting of the event and the wiper being moved into the predetermined position is less than half of the wipe cycle period.

5. The method of claim 4, wherein the predetermined amount of time between the detecting of the event and the wiper being moved into the predetermined position is more than half of the wipe cycle period.

6. The method of claim 1, wherein the surface is a window on the vehicle and the material is liquid.

7. The method of claim 1, wherein the event indicating that the material has stopped impacting the surface of the vehicle is deactivation of a pump configured to cause liquid to be dispensed onto the window of the vehicle.

8. The method of claim 3, wherein the predetermined position is the first position.

9. The method of claim 2, wherein the second number is zero.

10. A method for operating a wiper for removing liquid dispensed by a pump and impacting a window of a vehicle comprising:
    repeatedly moving the wiper across the window from a first position to a second position and from the second position to the first position to remove the liquid, the movement from the first position to the second position and from the second position to the first position defining a wipe cycle;
    detecting deactivation of the pump;
    performing a first number of wipe cycles if an amount of time between the detecting the deactivation of the pump and the wiper being moved into a predetermined position is less than a predetermined amount; and
    performing a second number of wipe cycles if the amount of time between the detecting the deactivation of the pump and the wiper being moved into the predetermined position is not less than a predetermined amount.

11. The method of claim 10, wherein the predetermined position is the first position.

12. The method of claim 10, wherein an amount of time between the movement from the first position to the second position and from the second position to the first position jointly define a wipe cycle period.

13. The method of claim 12, wherein the predetermined amount of time between the detecting the deactivation of the pump and the wiper being moved into the predetermined position is more than half of the wipe cycle period.

14. The method of claim 13, further comprising detecting activation of the pump and wherein the movement of the wiper across the window from a first position to a second position and from the second position to the first position to remove the liquid occurs after the pump is activated.

15. An automotive wiper system comprising:
    a wiper configured to remove liquid impacting a window of an automobile, the wiper being moveable between first and second positions;
    a motor coupled to a wiper and configured to move the wiper across the window from the first position to the second position and from the second position to the first position, the movement of the wiper from the first position to the second position and from second position back to the first position defining a wipe cycle; and
    a processor in operable communication with the motor, the processor being configured to:
       detect an event indicating that the liquid has stopped impacting the surface of the automobile;
       perform a first number of wipe cycles if an amount of time between the detecting of the event and the wiper being moved into a predetermined position is less than a predetermined amount; and
       perform a second number of wipe cycles if the amount of time between the detecting of the event and the wiper being moved into the predetermined position is not less than the predetermined amount, wherein the second number is less than the first number.

16. The system of claim 15, wherein an amount of time between the movement from the first position to the second position and from second position to the first position defines a wipe cycle period, and the predetermined amount of time between the detecting of the event and the wiper being moved into the predetermined position is more than half of the wipe cycle period.

17. The system of claim 16, further comprising a pump in operable communication with the processor and configured to dispense the liquid onto the window and wherein the event indicating that the liquid has stopped impacting the window of the automobile is deactivation of the pump.

18. The system of claim 17, wherein the predetermined position is the first position.

* * * * *